(12) United States Patent
Ding

(10) Patent No.: US 11,263,112 B2
(45) Date of Patent: Mar. 1, 2022

(54) METHOD AND APPARATUS FOR EVALUATING QUALITY OF SOFTWARE RUNNING ENVIRONMENT OF DEVICE

(71) Applicant: HUAWEI TECHNOLOGIES CO., LTD., Shenzhen (CN)

(72) Inventor: Yanghua Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 16/802,957

(22) Filed: Feb. 27, 2020

(65) Prior Publication Data

US 2020/0192782 A1 Jun. 18, 2020

Related U.S. Application Data

(63) Continuation of application No. PCT/CN2018/099354, filed on Aug. 8, 2018.

(30) Foreign Application Priority Data

Aug. 31, 2017 (CN) .......................... 201710767473.8

(51) Int. Cl.
*G06F 11/00* (2006.01)
*G06F 11/36* (2006.01)

(52) U.S. Cl.
CPC ................. *G06F 11/3612* (2013.01)

(58) Field of Classification Search
CPC ............. G06F 11/3612; H04J 3/0685
See application file for complete search history.

(56) References Cited

U.S. PATENT DOCUMENTS

| 9,063,769 B2 | 6/2015 | Damola et al. |
| 10,684,325 B2 * | 6/2020 | Huang ............. G01R 31/31709 |
| 10,845,404 B2 * | 11/2020 | Huang ....................... H03L 7/08 |

(Continued)

FOREIGN PATENT DOCUMENTS

| CN | 101299631 A | 11/2008 |
| CN | 101741853 A | 6/2010 |

(Continued)

OTHER PUBLICATIONS

Pasztor et al.,"PC Based Precision Timing Without GPS", Jun. 1, 2002, 10 pages.

(Continued)

*Primary Examiner* — Amine Riad
(74) *Attorney, Agent, or Firm* — Maier & Maier, PLLC

(57) ABSTRACT

A method and an apparatus for evaluating quality of a software running environment of a device. The method includes: determining time deviation values of a to-be-evaluated device in all of N time periods; determining an inherent deviation value based on the time deviation values in all of the N time periods; determining, based on the time deviation values in all of the N time periods and the inherent deviation value, timing jitter amplitudes in all of the N time periods; and selecting a target timing jitter amplitude with a largest timing jitter amplitude. The evaluation parameter for measuring the quality of the software running environment of the to-be-evaluated device can be obtained, and the quality of the software running environment of the device can be evaluated by using the evaluation parameter.

19 Claims, 11 Drawing Sheets

(56) References Cited

U.S. PATENT DOCUMENTS

| | | | | |
|---|---|---|---|---|
| 2005/0069031 A1* | 3/2005 | Sunter | .................... | H04L 1/205 |
| | | | | 375/224 |
| 2005/0111536 A1* | 5/2005 | Cranford, Jr. | .......... | H04B 3/462 |
| | | | | 375/226 |
| 2009/0081984 A1* | 3/2009 | Gailus | .................. | H03L 7/1974 |
| | | | | 455/323 |
| 2019/0044627 A1* | 2/2019 | Cohen | ................ | H04L 43/0823 |

FOREIGN PATENT DOCUMENTS

| | | |
|---|---|---|
| CN | 102799822 A | 11/2012 |
| CN | 103138863 A | 6/2013 |
| CN | 103516454 A | 1/2014 |
| CN | 105450454 A | 3/2016 |
| CN | 106375055 A | 2/2017 |
| CN | 106899370 A | 6/2017 |
| EP | 2787664 B1 | 5/2019 |

OTHER PUBLICATIONS

GS abc XXX V<m.t.e> (<yyyy-mm>), ETSI ,"Network Functions Virtualisation Infrastructure Key Quality Indicators", Jan. 13, 2014, 30 pages.

Mahmood et al., "Delay and Jitter Characterization for Software-Based Clock Synchronization Over WLAN Using PTP", IEEE Transactions on Industrial Informatics, vol. 10, No. 2, May 2014, 9 pages.

* cited by examiner

METHOD AND APPARATUS FOR EVALUATING QUALITY OF SOFTWARE RUNNING ENVIRONMENT OF DEVICE

CROSS-REFERENCE TO RELATED APPLICATIONS

This application is a continuation of International Application No. PCT/CN2018/099354, filed on Aug. 8, 2018, which claims priority to Chinese Patent Application No. 201710767473.8, filed on Aug. 31, 2017, the disclosures of the aforementioned applications are hereby incorporated by reference in their entireties.

TECHNICAL FIELD

Embodiments relate to the field of communications technologies, and in particular, to a method and an apparatus for evaluating quality of a software running environment of a device.

BACKGROUND

At present, a telecommunications device usually includes a main control device and a plurality of service processing devices, and the main control device and the plurality of service processing devices cooperate with each other to implement corresponding telecommunications service functions. The main control device is used for system configuration, statistics collection, monitoring, maintenance, and other management work. The service processing devices are used for service processing.

Generally, system time of an NTP (network time protocol) server is considered to be accurate and reliable. To synchronize time between the main control device and the plurality of service processing devices, the main control device first needs to synchronize system time with the NTP server, so that the system time of the main control device is consistent with the system time of the NTP server; and then system time of the plurality of service processing devices is synchronized with the system time of the main control device, so that the system time of the plurality of service processing devices is consistent with the system time of the main control device.

With an increasing requirement on telecommunications devices, currently, not only time synchronization between the main control device and the plurality of service processing devices is required, but also five-9 reliability is required for each telecommunications device, namely, 99.999% of device availability. This requires higher stability and reliability of application software running on a telecommunications device and this requirement remains unchanged after the telecommunications device implements clouding. When software of a telecommunications device runs on COTS (commercial off-the shelf) hardware provided by a third party, an increasingly urgent requirement is imposed on quality of a software running environment to ensure stability and reliability of the software of the telecommunications device. The quality of the software running environment of the telecommunications device needs to be evaluated accordingly to ensure higher stability and reliability of application software on a telecommunications device. In addition, the application software can run better on the telecommunications device only by adaptively adjusting the software based on the evaluation.

Therefore, how to evaluate the quality of the software running environment of the telecommunications device has become a technical problem that needs to be resolved urgently at present.

SUMMARY

Embodiments provide a method and an apparatus for evaluating quality of a software running environment of a device to obtain an evaluation parameter for measuring quality of a software running environment of a to-be-evaluated device, and evaluate the quality of the software running environment of the device by using the evaluation parameter.

The embodiments are implemented as follows.

According to a first aspect, an embodiment provides a method for evaluating quality of a software running environment of a device, and the method includes:

determining time deviation values of a to-be-evaluated device in all of N time periods, where the time deviation values in all of the N time periods include a time deviation value in a current time period and time deviation values in (N−1) time periods before the current time period, and N is a positive integer greater than or equal to 2;

determining an inherent deviation value based on the time deviation values in all of the N time periods, wherein the inherent deviation value is a mean value of the time deviation values in all of the N time periods;

determining, based on the time deviation values in all of the N time periods and the inherent deviation value, timing jitter amplitudes in all of the N time periods; and selecting, from the timing jitter amplitudes in all of the N time periods, a target timing jitter amplitude with a largest timing jitter amplitude, where the target timing jitter amplitude is an evaluation parameter for measuring the quality of the software running environment of the to-be-evaluated device.

In the first aspect, the inherent deviation value of the to-be-evaluated device may be determined based on the time deviation values of the to-be-evaluated device in all of the N time periods, and the inherent deviation value may be used as a base value for measuring the time deviation values of the to-be-evaluated device in all of the N time periods. The timing jitter amplitudes of the time deviation values, relative to the inherent deviation value, of the to-be-evaluated device in all of the N time periods may be determined based on the inherent deviation value and the time deviation values in all of the N time periods. Because the target timing jitter amplitude with the largest timing jitter amplitude among the timing jitter amplitudes in all of the N time periods can reflect the quality of the software running environment, the target timing jitter amplitude is used as the evaluation parameter for measuring the quality of the software running environment of the to-be-evaluated device. In this way, in this embodiment, the evaluation parameter for measuring the quality of the software running environment of the to-be-evaluated device can be obtained, and the quality of the software running environment of the device can be evaluated by using the evaluation parameter.

In a possible implementation, the determining time deviation values of a to-be-evaluated device in all of N time periods includes:

obtaining first running duration of a target device, where the first running duration is running duration of the target device at a starting time point in the current time period;

determining second running duration of the target device, where the second running duration is running duration of the target device at an ending time point in the current time period;

determining first system time of the to-be-evaluated device at the ending time point in the current time period;

determining, based on the second running duration and the first running duration, third running duration of the target device from the starting time point to the ending time point in the current time period;

determining, based on the first system time and the third running duration, predicted system time of the target device at the starting time point in the current time period;

determining, based on the predicted system time and actual system time, the time deviation value of the to-be-evaluated device in the current time period, where the actual system time is system time of the target device at the starting time point in the current time period; and obtaining the time deviation values of the to-be-evaluated device in all of (N−1) time periods before the current time period.

The predicted system time is calculated by the to-be-evaluated device based on the first running duration, the second running duration, and the first system time, and inaccurate predicted system time is calculated due to impact of the software running environment of the to-be-evaluated device. A greater time deviation value between the predicted system time and the actual system time indicates worse quality of the software running environment of the to-be-evaluated device, and a smaller time deviation value between the predicted system time and the actual system time indicates better quality of the software running environment of the to-be-evaluated device. In this case, the time deviation value in the current time period in the N time periods can be calculated. In addition, because the time deviation values in all of the (N−1) time periods before the current time period have been pre-calculated, the time deviation values of the to-be-evaluated device in all of the N time periods can be determined by using the method provided in this embodiment.

In a possible implementation, the determining second running duration of the target device includes:

obtaining a time deviation value in a previous time period of the current time period;

obtaining fourth running duration of the to-be-evaluated device, where the fourth running duration is running duration of the to-be-evaluated device at the ending time point in the current time period;

determining a startup time difference between the to-be-evaluated device and the target device; and determining the second running duration of the target device based on the fourth running duration, the startup time difference, and the time deviation value in the previous time period.

The to-be-evaluated device pre-stores the time deviation value in the previous time period of the current time period, the to-be-evaluated device records the fourth running duration, and the startup time difference between the to-be-evaluated device and the target device can be determined. In this case, the second running duration of the target device can be obtained by adding the fourth running duration, the startup time difference and the time deviation value in the previous time period.

In a possible implementation, the determining a startup time difference between the to-be-evaluated device and the target device includes:

obtaining second system time and fifth running duration of the target device, where the second system time is system time of the target device at a first target time point, and the fifth running duration is running duration of the target device at the first target time point;

obtaining third system time and sixth running duration of the to-be-evaluated device, where the third system time is system time of the to-be-evaluated device at a second target time point, and the sixth running duration is running duration of the to-be-evaluated device at the second target time point, with the first target time point being earlier than the second target time point;

determining, based on the second system time and the third system time, duration between the first target time point and the second target time point;

determining, based on the duration and the fifth running duration, seventh running duration of the target device at the second target time point; and determining, based on the seventh running duration and the sixth running duration, the startup time difference between the to-be-evaluated device and the target device.

The first target time point and the second target time point are both time points before the starting time point in the current time period, and the first target time point is earlier than the second target time point. The duration between the first target time point and the second target time point can be determined by calculating a time difference between the second system time and the third system time. The seventh running duration of the target device at the second target time point can be determined by adding the duration and the fifth running duration. Because the seventh running duration is the running duration of the target device at the second target time point, and the sixth running duration is the running duration of the to-be-evaluated device at the second target time point, the startup time difference between the to-be-evaluated device and the target device can be determined by calculating a time difference between the seventh running duration and the sixth running duration.

In a possible implementation, the determining, based on the predicted system time and actual system time, the time deviation value of the to-be-evaluated device in the current time period includes:

sending the predicted system time to the target device; and receiving the time deviation value of the to-be-evaluated device in the current time period sent by the target device, where the time deviation value of the to-be-evaluated device in the current time period is a time deviation value calculated by the target device based on the predicted system time and the actual system time.

The target device may frequently adjust system time, and therefore the actual system time changes. In this case, the to-be-evaluated device may send the predicted system time to the target device, so that the target device calculates the time deviation value based on the predicted system time and the actual system time. This ensures accuracy of the actual system time. Then the to-be-evaluated device receives the time deviation value of the to-be-evaluated device in the current time period sent by the target device, to ensure that the calculated time deviation value is more accurate.

In a possible implementation, the determining, based on the predicted system time and actual system time, the time deviation value of the to-be-evaluated device in the current time period includes:

sending a request for obtaining the actual system time to the target device;

receiving the actual system time sent by the target device; and calculating, based on the predicted system time and the actual system time, the time deviation value of the to-be-evaluated device in the current time period.

The target device may frequently adjust system time, and therefore the actual system time changes. In this case, the to-be-evaluated device may send the request for obtaining the actual system time to the target device, so that the target device sends an adjusted actual system time to the to-be-evaluated device. Then the to-be-evaluated device calculates the time deviation value by using the actual system time adjusted by the target device and the predicted system time, to ensure that the calculated time deviation value is more accurate.

In a possible implementation, the determining, based on the predicted system time and actual system time, the time deviation value of the to-be-evaluated device in the current time period includes:

obtaining the pre-stored actual system time; and calculating, based on the predicted system time and the actual system time, the time deviation value of the to-be-evaluated device in the current time period.

In some scenarios, the target device may not adjust the system time, and therefore the actual system time remains unchanged. In this case, the to-be-evaluated device may calculate, by using the pre-stored actual system time and the calculated predicted system time, the time deviation value of the to-be-evaluated device in the current time period. Interaction with the target device is not required, saving system resources of the to-be-evaluated device.

In a possible implementation, the determining time deviation values of a to-be-evaluated device in all of N time periods includes:

obtaining eighth running duration and fourth system time of the to-be-evaluated device, where the eighth running duration is running duration of the to-be-evaluated device at an ending time point in the current time period, and the fourth system time is system time of the to-be-evaluated device at the ending time point in the current time period;

obtaining ninth running duration and fifth system time of the to-be-evaluated device, where the ninth running duration is running duration of the to-be-evaluated device at a starting time point in the current time period, and the fifth system time is system time of the to-be-evaluated device at the starting time point in the current time period;

determining, based on the eighth running duration and the ninth running duration, tenth running duration of the to-be-evaluated device from the starting time point to the ending time point in the current time period;

determining, based on the fourth system time and the fifth system time, eleventh running duration of the to-be-evaluated device from the starting time point to the ending time point in the current time period;

determining, based on the tenth running duration and the eleventh running duration, the time deviation value of the to-be-evaluated device in the current time period; and obtaining the time deviation values of the to-be-evaluated device in all of the (N−1) time periods before the current time period.

The fourth system time and the fifth system time of the to-be-evaluated device may be inaccurate because both the fourth system time and the fifth system time of the to-be-evaluated device are obtained by using a network. The eighth running duration and the ninth running duration of the to-be-evaluated device are comparatively accurate because the eighth running duration and the ninth running duration of the to-be-evaluated device are internal statistical results of the to-be-evaluated device. In this case, if it is determined, based on the tenth running duration and the eleventh running duration, that the to-be-evaluated device has a time deviation value in the current time period, the time deviation value is caused by inaccurate fourth system time and inaccurate fifth system time. The quality of the network environment of the to-be-evaluated device can be evaluated in this embodiment. A greater time deviation value indicates worse quality of a network environment of the to-be-evaluated device, and a smaller time deviation value indicates better quality of the network environment of the to-be-evaluated device.

In a possible implementation, the determining time deviation values of a to-be-evaluated device in all of N time periods includes:

obtaining twelfth running duration of the to-be-evaluated device, where the twelfth running duration is running duration of the to-be-evaluated device at an ending time point in the current time period, and the ending time point in the current time period is determined by a period timer;

obtaining thirteenth running duration of the to-be-evaluated device, where the thirteenth running duration is running duration of the to-be-evaluated device at a starting time point in the current time period, and the starting time point in the current time period is determined by the period timer;

determining, based on the twelfth running duration and the thirteenth running duration, fourteenth running duration of the to-be-evaluated device from the starting time point to the ending time point in the current time period;

determining, based on the fourteenth running duration and the current time period, the time deviation value of the to-be-evaluated device in the current time period; and obtaining the time deviation values of the to-be-evaluated device in all of the (N−1) time periods before the current time period.

There is the accuracy deviation because the period timer is affected by the software running environment of the to-be-evaluated device; in this case, the time deviation value of the to-be-evaluated device in the current time period can reflect the quality of the software running environment of the to-be-evaluated device. A greater time deviation value indicates worse quality of a network environment of the to-be-evaluated device, and a smaller time deviation value indicates better quality of the network environment of the to-be-evaluated device.

According to a second aspect, an apparatus for evaluating quality of a software running environment of a device is provided, and the apparatus includes:

a first determining module, configured to determine time deviation values of a to-be-evaluated device in all of N time periods, where the time deviation values in all of the N time periods include a time deviation value in a current time period and time deviation values in (N−1) time periods before the current time period, and N is a positive integer greater than or equal to 2;

a second determining module, configured to determine an inherent deviation value based on the time deviation values in all of the N time periods, where the inherent deviation value is a mean value of the time deviation values in all of the N time periods;

a third determining module, configured to determine, based on the time deviation values in all of the N time periods and the inherent deviation value, timing jitter amplitudes in all of the N time periods; and a selection module, configured to select, from the timing jitter amplitudes in all of the N time periods, a target timing jitter amplitude with a largest timing jitter amplitude, where the target timing jitter amplitude is an evaluation parameter for measuring the quality of the software running environment of the to-be-evaluated device.

In a possible implementation, the first determining module may be configured to: obtain first running duration of a target device, where the first running duration is running duration of the target device at a starting time point in the current time period; determine second running duration of the target device, where the second running duration is running duration of the target device at an ending time point in the current time period; determine first system time of the to-be-evaluated device at the ending time point in the current time period; determine, based on the second running duration and the first running duration, third running duration of the target device from the starting time point to the ending time point in the current time period; determine, based on the first system time and the third running duration, predicted system time of the target device at the starting time point in the current time period; determine, based on the predicted system time and actual system time, the time deviation value of the to-be-evaluated device in the current time period, where the actual system time is system time of the target device at the starting time point in the current time period; and obtain the time deviation values of the to-be-evaluated device in all of the (N−1) time periods before the current time period.

In a possible implementation, the first determining module may be configured to: obtain a time deviation value in a previous time period of the current time period; obtain fourth running duration of the to-be-evaluated device, where the fourth running duration is running duration of the to-be-evaluated device at the ending time point in the current time period; determine a startup time difference between the to-be-evaluated device and the target device; and determine the second running duration of the target device based on the fourth running duration, the startup time difference, and the time deviation value in the previous time period.

In a possible implementation, the first determining module may be configured to: obtain second system time and fifth running duration of the target device, where the second system time is system time of the target device at a first target time point, and the fifth running duration is running duration of the target device at the first target time point; obtain third system time and sixth running duration of the to-be-evaluated device, where the third system time is system time of the to-be-evaluated device at a second target time point, and the sixth running duration is running duration of the to-be-evaluated device at the second target time point, with the first target time point being earlier than the second target time point; determine, based on the second system time and the third system time, duration between the first target time point and the second target time point; determine, based on the duration and the fifth running duration, seventh running duration of the target device at the second target time point; and determine, based on the seventh running duration and the sixth running duration, the startup time difference between the to-be-evaluated device and the target device.

In a possible implementation, the first determining module may be configured to: send the predicted system time to the target device; and receive the time deviation value of the to-be-evaluated device in the current time period sent by the target device, where the time deviation value of the to-be-evaluated device in the current time period is a time deviation value calculated by the target device based on the predicted system time and the actual system time.

In a possible implementation, the first determining module may be configured to: send a request for obtaining the actual system time to the target device; receive the actual system time sent by the target device; and calculate, based on the predicted system time and the actual system time, the time deviation value of the to-be-evaluated device in the current time period.

In a possible implementation, the first determining module may be configured to: obtain the pre-stored actual system time; and calculate, based on the predicted system time and the actual system time, the time deviation value of the to-be-evaluated device in the current time period.

In a possible implementation, the first determining module may be configured to: obtain eighth running duration and fourth system time of the to-be-evaluated device, where the eighth running duration is running duration of the to-be-evaluated device at an ending time point in the current time period, and the fourth system time is system time of the to-be-evaluated device at the ending time point in the current time period; obtain ninth running duration and fifth system time of the to-be-evaluated device, where the ninth running duration is running duration of the to-be-evaluated device at a starting time point in the current time period, and the fifth system time is system time of the to-be-evaluated device at the starting time point in the current time period; determine, based on the eighth running duration and the ninth running duration, tenth running duration of the to-be-evaluated device from the starting time point to the ending time point in the current time period; determine, based on the fourth system time and the fifth system time, eleventh running duration of the to-be-evaluated device from the starting time point to the ending time point in the current time period; determine, based on the tenth running duration and the eleventh running duration, the time deviation value of the to-be-evaluated device in the current time period; and obtain the time deviation values of the to-be-evaluated device in all of the (N−1) time periods before the current time period.

In a possible implementation, the first determining module may be configured to: obtain twelfth running duration of the to-be-evaluated device, where the twelfth running duration is running duration of the to-be-evaluated device at an ending time point in the current time period, and the ending time point in the current time period is determined by a period timer; obtain thirteenth running duration of the to-be-evaluated device, where the thirteenth running duration is running duration of the to-be-evaluated device at a starting time point in the current time period, and the starting time point in the current time period is determined by the period timer; determine, based on the twelfth running duration and the thirteenth running duration, fourteenth running duration of the to-be-evaluated device from the starting time point to the ending time point in the current time period; determine, based on the fourteenth running duration and the current time period, the time deviation value of the to-be-evaluated device in the current time period; and obtain the time deviation values of the to-be-evaluated device in all of the (N−1) time periods before the current time period.

According to a third aspect, an embodiment provides an apparatus for evaluating quality of a software running environment of a device. The apparatus includes: a processor and a memory. The memory stores an operation instruction executable by the processor, and the processor reads the operation instruction stored in the memory to implement the method described in any one of the first aspect or the possible implementations of the first aspect.

DESCRIPTION OF EMBODIMENTS

Figure 1:
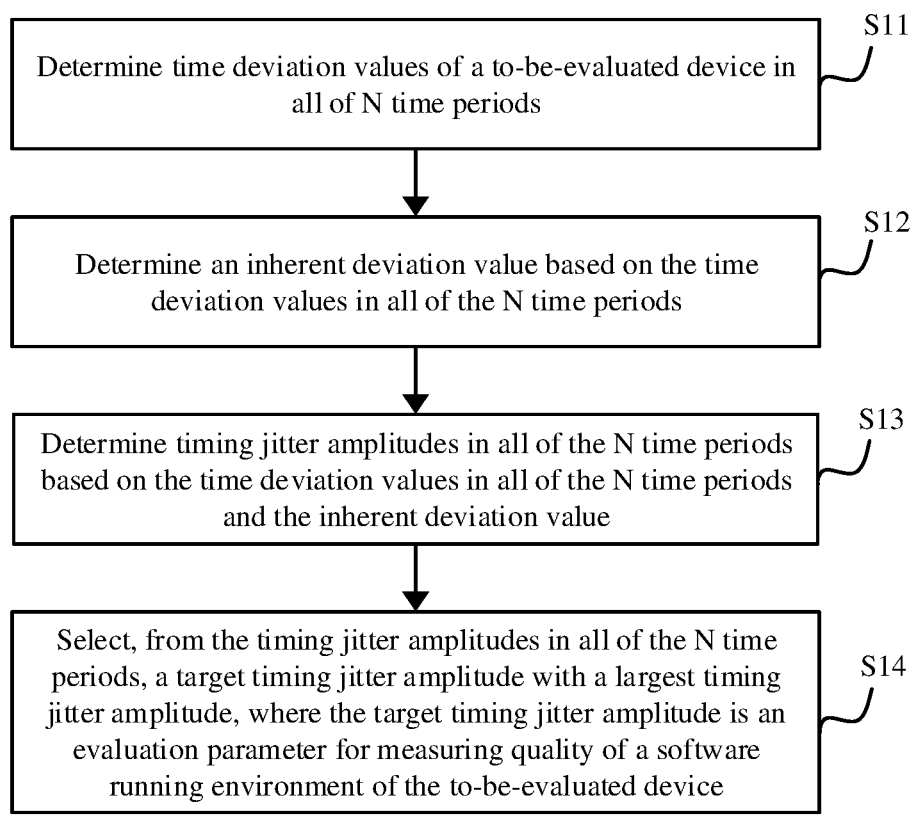
FIG. 1 is a flowchart of a method for evaluating quality of a software running environment of a device according to an embodiment.

Quality of a software running environment is a comprehensive evaluation of a to-be-evaluated device in dimensions of time and space. The quality of the software running environment includes: scheduling timeliness of an operating system of the to-be-evaluated device, system clock accuracy of the to-be-evaluated device, a memory access speed of the to-be-evaluated device, a network interaction delay of the to-be-evaluated device, a data cache size of the to-be-evaluated device, a message queue depth of the to-be-evaluated device, and other indicators. If any one of the foregoing indicators indicates poor quality, it may indicate that the quality of the software running environment of the to-be-evaluated device is poor. If each of the foregoing indicators indicates good quality, it may indicate that the quality of the software running environment of the to-be-evaluated device is comparatively good.

Among the listed indicators, the "scheduling timeliness", the "system clock accuracy", the "memory access speed", and the "network interaction delay" are evaluated in the time dimension, while the "data cache size" and the "message queue depth" are evaluated in the space dimension. However, the "data cache size" and the "message queue depth" ultimately reflect a data providing "speed" and a message processing "speed" of the to-be-evaluated device, respectively, and are ultimately reflected in the time dimension.

In addition, for a to-be-evaluated device, quality of the software running environment of the to-be-evaluated device is also reflected in implementation methods of application software, for example, event processing duration and a message queue processing strategy of the application software. All of the implementation methods affect a scheduling speed of an operating system.

In this case, a result of evaluating the to-be-evaluated device in the time dimension can not only reflect the quality of the software running environment of the to-be-evaluated device but also reflect quality of the application software running in the software running environment of the to-be-evaluated device. Therefore, measurement of a time synchronization result of the to-be-evaluated device can reflect the indicators such as the "scheduling timeliness", the "system clock accuracy", the "memory access speed", and the "network interaction delay" of the to-be-evaluated device.

As mentioned above, how to evaluate the quality of the software running environment of the telecommunications device has become a technical problem that needs to be resolved urgently at present. However, there is no general evaluation method or standard in the industry at present.

A method and an apparatus for evaluating quality of a software running environment of a device provided by the embodiments can dynamically evaluate the quality of the software running environment of the device, and an evaluation method is to evaluate a time synchronization result of the to-be-evaluated device. A full understanding of the quality of the software running environment of the device can be obtained based on the evaluation result. Then the to-be-evaluated device or a staff can adjust, based on the evaluation result, application software running on the device, so that the application software can better adapt to the software running environment of the device, thereby improving stability and reliability of the application software running on the device.

The following describes technical solutions in the embodiments with reference to accompanying drawings in the embodiments.

FIG. 1 is a flowchart of a method for evaluating quality of a software running environment of a device according to an embodiment. An evaluation parameter for measuring the quality of the software running environment of the to-be-evaluated device can be obtained by using the method shown in FIG. 1, so that application software on the to-be-evaluated device is adjusted based on the evaluation parameter. In this way, the application software better adapts to the software running environment of the to-be-evaluated device. The method includes the following steps.

Step S11: Determine time deviation values of a to-be-evaluated device in all of N time periods.

The method provided in this embodiment is applicable to the to-be-evaluated device.

The quality of the software running environment of the to-be-evaluated device needs to be evaluated to ensure that the application software can stably run on the to-be-evaluated device. In addition, the application software running on the to-be-evaluated device is adjusted based on the evaluation result, so that the application software can better adapt to the software running environment of the to-be-evaluated device. This ensures comparatively high reliability of the application software running on the to-be-evaluated device.

The evaluation parameter for measuring the quality of the software running environment of the to-be-evaluated device is obtained by using the method provided in this embodiment. After obtaining the evaluation parameter, the to-be-evaluated device can adjust the application software based on the evaluation parameter, so that the application software better adapts to the software running environment of the to-be-evaluated device.

Target timing jitter amplitudes need to be determined in this embodiment based on the time deviation values of the to-be-evaluated device in all of the N time periods and an inherent deviation value, to evaluate the quality of the software running environment of the to-be-evaluated device. The target timing jitter amplitude is an evaluation parameter for measuring the quality of the software running environment of the to-be-evaluated device.

In this embodiment, N is a positive integer greater than or equal to 2. The time deviation values in all of the N time periods include a time deviation value in a current time period and time deviation values in (N−1) time periods before the current time period. The N time periods of the to-be-evaluated device are pre-determined. For example, 10 time periods of the to-be-evaluated device are predetermined as the N time periods, where the 10 time periods of the to-be-evaluated device are a current time period and previous 9 time periods of the current time period.

The time deviation value in the time period refers to a difference between clock time of the to-be-evaluated device in the time period and standard time, and the standard time may be system time of an NTP server.

For example, assuming a time period of five minutes, a difference between clock time of the to-be-evaluated device in the time period of five minutes and standard time is calculated to be 100 milliseconds.

In the method provided in this embodiment, the "Determine time deviation values of a to-be-evaluated device in all of N time periods" is implemented in a plurality of manners, and the manners are to be described one by one in the following embodiments.

The to-be-evaluated device mentioned in this embodiment may be a service board constituting a telecommunications device. The target device mentioned in this embodiment may be a main control board constituting the telecommunications device. A CPU, a memory, and other components are disposed on each service board, and each service board is configured with an independent operating system. Application software for implementing a service function may be installed on the operating system corresponding to the service board can be installed with A CPU, a memory, and other components are also disposed on the main control board, and the main control board is also configured with an independent operating system. Various application software may also be installed on the operating system corresponding to the main control board.

For example, a telecommunications device is integrated with a plurality of service boards and one main control board. The main control board and the plurality of service boards cooperate with to implement corresponding telecommunications service functions. The main control board is used for system configuration, statistics collection, monitoring, maintenance, and other management work. The plurality of service boards are used for service processing.

The to-be-evaluated device mentioned in this embodiment may alternatively be a service device constituting a telecommunications device. The target device mentioned in this embodiment may alternatively be a main control device constituting the telecommunications device. A CPU, a memory, and other components are disposed on each service device, and each service device is configured with an independent operating system. Application software for implementing a service function may be installed on the operating system corresponding to the service device. A CPU, a memory, and other components are also disposed on the main control device, and the main control device is also configured with an independent operating system. Various application software may also be installed on the operating system corresponding to the main control device.

For example, a telecommunications device in the cloud includes a main control device and a plurality of service devices, and the main control device and the plurality of service devices cooperate with each other to implement corresponding telecommunications service functions. The main control device is used for system configuration, statistics collection, monitoring, maintenance, and other management work. The plurality of service devices are used for service processing.

Step S12: Determine the inherent deviation value based on the time deviation values in all of the N time periods.

The inherent deviation value is a mean value of the time deviation values in all of the N time periods.

For example, if N is 3 and the time deviation values in the 3 time periods are 110 milliseconds, 130 milliseconds, and 150 milliseconds, inherent deviation value=(110 milliseconds+130 milliseconds+150 milliseconds)/3=130 milliseconds.

The inherent deviation value may be used as a base value for measuring the time deviation values of the to-be-evaluated device in all of the N time periods; therefore the timing jitter amplitudes in all of the N time periods can be obtained based on the inherent deviation value and the time deviation values in all of the N time periods.

Step S13: Determine, based on the time deviation values in all of the N time periods and the inherent deviation value, the timing jitter amplitudes in all of the N time periods.

The timing jitter amplitudes in all of the N time periods are determined in numerous manners. One manner is to be briefly described in the following.

The timing jitter amplitudes in all of the N time periods can be obtained by calculating absolute values of differences between the time deviation values in all of the N time periods and the inherent deviation value.

For example, if N is 3, a time deviation value in a first time period in the three time periods is 110 milliseconds, a time deviation value in a second time period in the three time periods is 130 milliseconds, and a time deviation value in a third time period in the three time periods is 210 milliseconds, inherent deviation value=(110 milliseconds+130 milliseconds+210 milliseconds)/3=150 milliseconds Timing jitter amplitude in the first time period in the three time periods=|time deviation value in the first time period−inherent deviation value|=|110 milliseconds−150 milliseconds|=|−40 milliseconds|=40 milliseconds, timing jitter amplitude in the second time period in the three time periods=Rime deviation value in the second time period−inherent deviation value|=|130 milliseconds−150 milliseconds|=|−20 milliseconds|=20 milliseconds, and timing jitter amplitude in the third time period in the three time periods=| time deviation value in the third time period−inherent deviation value|=|210 milliseconds−150 milliseconds|=60 milliseconds. After calculation, it can be learned that the timing jitter amplitudes in all of the three time periods are 40 milliseconds, 20 milliseconds, and 60 milliseconds.

The timing jitter amplitude in a time period refers to a timing jitter amplitude of a time deviation value in the time period relative to the inherent deviation value. A larger timing jitter amplitude in a time period indicates worse quality of a software running environment of the to-be-evaluated device in the time period; and a smaller timing jitter amplitude in a time period indicates better quality of the software running environment of the to-be-evaluated device in the time period.

Step S14: Select, from the timing jitter amplitudes in all of the N time periods, a target timing jitter amplitude with a largest timing jitter amplitude.

After determining the timing jitter amplitudes in all of the N time periods, the target timing jitter amplitude with the largest timing jitter amplitude needs to be selected from the timing jitter amplitudes in all of the N time periods.

The target timing jitter amplitude indicates worst quality of the software running environment of the to-be-evaluated device in the N time periods.

The target timing jitter amplitude may be used as the evaluation parameter for measuring the quality of the software running environment of the to-be-evaluated device. This is because the worst quality of the software running environment of the to-be-evaluated device in the N time periods may be learned after the target timing jitter amplitude is determined. In this case, the to-be-evaluated device or a staff can use the worst quality of the software running environment of the to-be-evaluated device as a critical point, and adjust, based on the critical point, the application software running on the to-be-evaluated device. Therefore, using the target timing jitter amplitude as the evaluating parameter for measuring the quality of the software running environment of the to-be-evaluated device can make the application software better adapt to the software running environment of the to-be-evaluated device.

For example, a processing manner of a reception response and timeout retransmission is used during message communication between a to-be-evaluated device and a target device. If the target timing jitter amplitude is calculated to be 100 milliseconds, it indicates that the target timing jitter amplitude is comparatively small, and that the quality of the software running environment of the to-be-evaluated device is comparatively good. In this case, duration for timeout message retransmission can be set to 1 second. If the target timing jitter amplitude is calculated to be 2 milliseconds, it indicates that the target timing jitter amplitude is comparatively large, and that the quality of the software running environment of the to-be-evaluated device is comparatively poor. In this case, duration for timeout message retransmission can be appropriately prolonged. This reduces unnecessary timeout retransmission processing caused by the quality of the software running environment of the to-be-evaluated device.

In the embodiment as shown in FIG. 1, the inherent deviation value of the to-be-evaluated device may be determined based on the time deviation values of the to-be-evaluated device in all of the N time periods, and the inherent deviation value may be used as a base value for measuring the time deviation values of the to-be-evaluated device in all of the N time periods. The timing jitter amplitudes of the time deviation values, relative to the inherent deviation value, of the to-be-evaluated device in all of the N time periods may be determined based on the inherent deviation value and the time deviation values in all of the N time periods. Because the target timing jitter amplitude with the largest timing jitter amplitude among the timing jitter amplitudes in all of the N time periods can reflect the quality of the software running environment, the target timing jitter amplitude is used as the evaluation parameter for measuring the quality of the software running environment of the to-be-evaluated device. In this way, in this embodiment, the evaluation parameter for measuring the quality of the software running environment of the to-be-evaluated device can be obtained, and the quality of the software running environment of the device can be evaluated by using the evaluation parameter.

To better describe a principle of the method shown in FIG. 1, the following provides description by examples.

Figure 2:
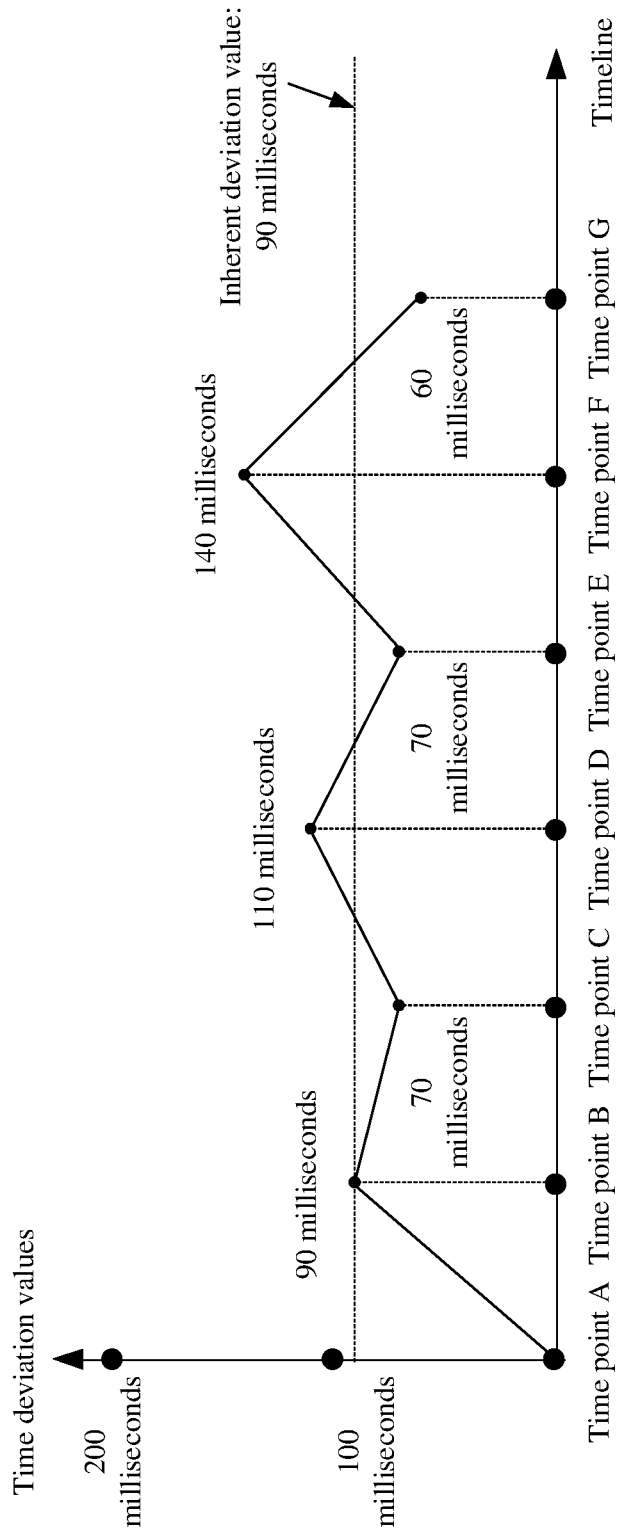
FIG. 2 is a schematic diagram of time deviation values in all of N time periods.

FIG. 2 is a schematic diagram of time deviation values in all of the N time periods. Assuming that N is 6, a time point A to a time point B constitute a first time period, the time point B to a time point C constitute a second time period, the time point C to a time point D constitute a third time period, the time point D to a time point E constitute a fourth time period, the time point E to a time point F constitute a fifth time period, and the time point F to a time point G constitute a sixth time period.

Step 1: Determine time deviation values of the to-be-evaluated device in all of the six time periods.

The time deviation values in all of the six time periods are as follows: A time deviation value in the first time period is 90 milliseconds, a time deviation value in the second time period is 70 milliseconds, a time deviation value in the third time period is 110 milliseconds, a time deviation value in the fourth time period is 70 milliseconds, a time deviation value in the fifth time period is 140 milliseconds, and a time deviation value in the sixth time period is 60 milliseconds.

Step 2: Determine an inherent deviation value based on the time deviation values in all of the six time periods.

Inherent deviation value=(90 milliseconds+70 milliseconds+110 milliseconds+70 milliseconds+140 milliseconds+60 milliseconds)/6=90 milliseconds.

Step 3: Determine, based on the time deviation values in all of the six time periods and the inherent deviation value, timing jitter amplitudes in all of the six time periods.

Timing jitter amplitude in the first time period=|time deviation value in the first time period−inherent deviation value|=|90 milliseconds−90 milliseconds|=0 milliseconds.

Timing jitter amplitude in the second time period=|time deviation value in the second time period−inherent deviation value|=|70 milliseconds−90 milliseconds|=20 milliseconds.

Timing jitter amplitude in the third time period=|time deviation value in the third time period−inherent deviation value|=|110 milliseconds−90 milliseconds|=20 milliseconds.

Timing jitter amplitude in the fourth time period=|time deviation value in the fourth time period−inherent deviation value|=|70 milliseconds−90 milliseconds|=20 milliseconds.

Timing jitter amplitude in the fifth time period=|time deviation value in the fifth time period−inherent deviation value|=|140 milliseconds−90 milliseconds|=50 milliseconds.

Timing jitter amplitude in the sixth time period=|time deviation value in the sixth time period−inherent deviation value|=|60 milliseconds−90 milliseconds|=30 milliseconds.

Step 4: Select, from the timing jitter amplitudes in all of the six time periods, a target timing jitter amplitude with a largest timing jitter amplitude, where the target timing jitter amplitude 50 milliseconds is an evaluation parameter for measuring the quality of the software running environment of the to-be-evaluated device.

The timing jitter amplitudes in all of the six time periods are 0 milliseconds, 20 milliseconds, 20 milliseconds, 20 milliseconds, 50 milliseconds, and 30 milliseconds. The largest timing jitter amplitude in all of the six time periods is 50 milliseconds, and therefore the target timing jitter amplitude is 50 milliseconds.

After the target timing jitter amplitude is determined, the worst quality of the software running environment of the to-be-evaluated device in the six time periods can be learned. In this case, the to-be-evaluated device or a staff can use the worst quality of the software running environment of the to-be-evaluated device as a critical point, and adjust, based on the critical point, application software running on the to-be-evaluated device, so that the application software can better adapt to the software running environment of the to-be-evaluated device.

Figure 3:
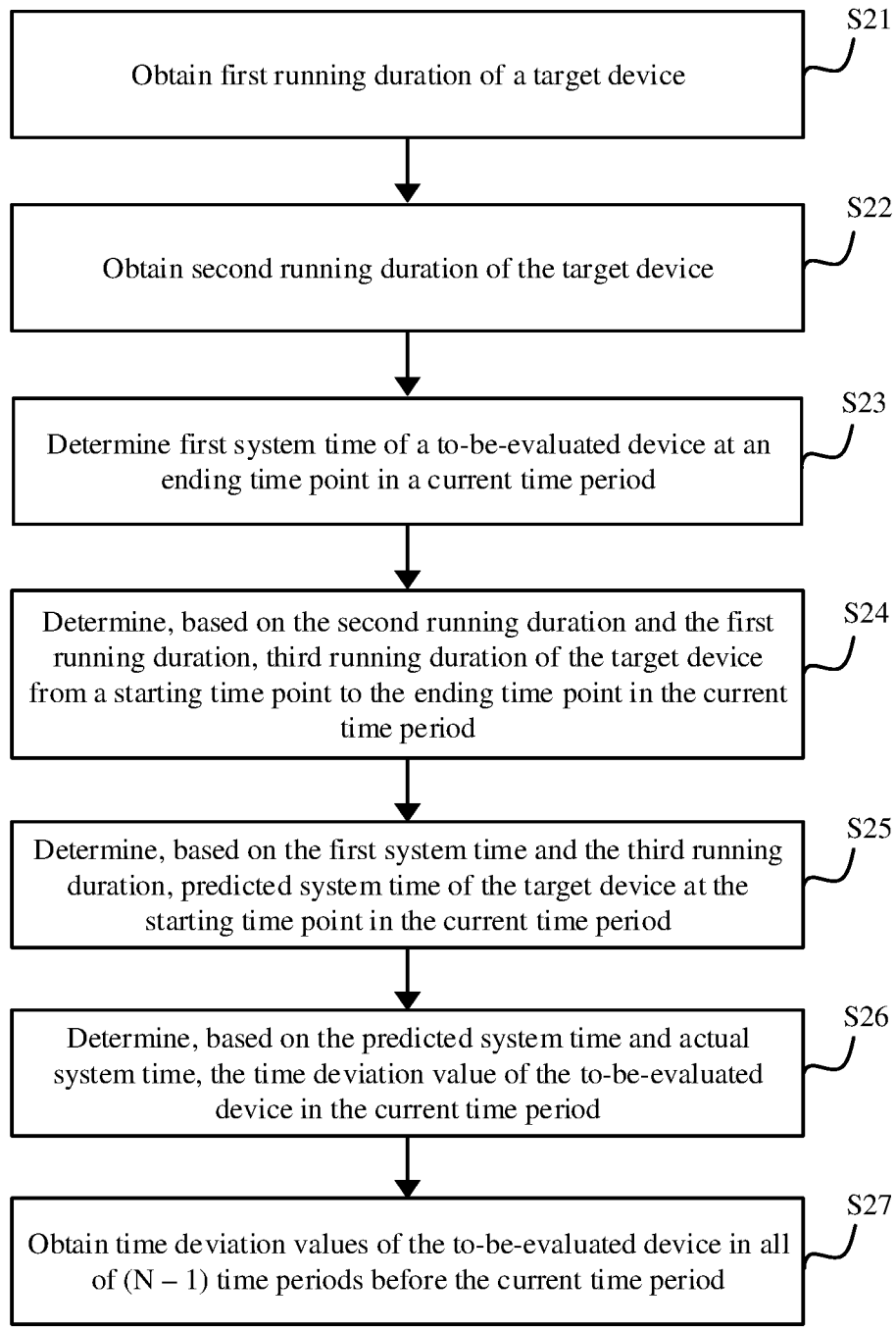
FIG. 3 is a flowchart of an embodiment described in detail based on step S11 in FIG. 1.

Referring to FIG. 3, an embodiment shown in FIG. 3 is a flowchart of an embodiment described in detail based on step S11 in FIG. 1. Therefore, for the same content as that in FIG. 1, refer to the embodiment shown in FIG. 1. The method shown in FIG. 3 is a exemplary implementation of "Determine time deviation values of a to-be-evaluated device in all of N time periods" in step S11 in FIG. 1. The "Determine time deviation values of a to-be-evaluated device in all of N time periods" may further include the following steps.

Step S21: Obtain first running duration of a target device.

The first running duration is running duration of the target device at a starting time point in the current time period, where the current time period is a time period that the to-be-evaluated device and the target device are currently in, and the starting time point in the current time period refers to the beginning of the time period that the to-be-evaluated device and the target device are currently in.

The target device records the first running duration, and then the target device sends the first running duration to the to-be-evaluated device. When the to-be-evaluated device receives the first running duration sent by the target device, the to-be-evaluated device stores the first running duration of the target device in the memory. When the to-be-evaluated device needs to calculate the time deviation value in the current time period in the N time periods, the to-be-evaluated device obtains the first running duration of the target device in the memory.

Step S22: Determine second running duration of the target device.

The second running duration is running duration of the target device at an ending time point in the current time period, where the current time period is the time period that the to-be-evaluated device and the target device are currently in, and the ending time point in the current time period refers to the end of the time period that the to-be-evaluated device and the target device are currently in.

After the to-be-evaluated device obtains the first running duration of the target device, the second running duration of the target device further needs to be determined.

Step S23: Determine first system time of the to-be-evaluated device at the ending time point in the current time period.

The first system time is system time of the to-be-evaluated device at the ending time point in the current time period.

Because the system time of the NTP server is considered to be accurate and reliable, the target device periodically synchronizes time with the NTP server to keep system time of the target device consistent with the system time of the NTP server. To ensure that the system time of the target device is consistent with the system time of the to-be-evaluated device, the target device periodically makes the to-be-evaluated device synchronize with the system time of the target device.

Step S24: Determine, based on the second running duration and the first running duration, third running duration of the target device from the starting time point to the ending time point in the current time period.

Because the first running duration is the running duration of the target device at the starting time point in the current time period, and the second running duration is the running duration of the target device at the ending time point in the current time period, the third running duration of the target device from the starting time point to the ending time point in the current time period can be obtained by calculating a difference between the second running duration and the first running duration.

Step S25: Determine, based on the first system time and the third running duration, predicted system time of the target device at the starting time point in the current time period.

Because the third running duration is the running duration of the target device from the starting time point to the ending time point in the current time period, and the first system time is system time of the to-be-evaluated device at the ending time point in the current time period, the predicted system time of the target device at the starting time point in the current time period can be obtained by calculating a difference between the first system time and the third running duration.

The predicted system time of the target device at the starting time point in the current time period is calculated by the to-be-evaluated device based on the first running duration, the second running duration, and the first system time. Consequently, the predicted system time may not be correct time.

Step S26: Determine, based on the predicted system time and actual system time, the time deviation value of the to-be-evaluated device in the current time period.

The actual system time is system time of the target device at the starting time point in the current time period, and the actual system time is correct. The difference between the predicted system time and the actual system time is the time deviation value of the to-be-evaluated device in the current time period.

A larger time deviation value of the to-be-evaluated device in the current time period indicates worse quality of a software running environment of the to-be-evaluated device, and a smaller time deviation value of the to-be-evaluated device in the current time period indicates better quality of the software running environment of the to-be-evaluated device.

Step S27: Obtain time deviation values of the to-be-evaluated device in all of (N−1) time periods before the current time period.

Because the time deviation values in all of the N time periods include the time deviation value in the current time period and the time deviation values in the (N−1) time periods before the current time period, after the time deviation value in the current time period is determined, the time deviation values of the to-be-evaluated device in all of (N−1) time periods before the current time period further needs to be obtained to obtain all of the time deviation values in all of the N time periods.

In the embodiment shown in FIG. 3, the predicted system time is calculated by the to-be-evaluated device based on the first running duration, the second running duration, and the first system time, and inaccurate predicted system time is calculated due to impact of the software running environment of the to-be-evaluated device. A greater time deviation value between the predicted system time and the actual system time indicates worse quality of the software running environment of the to-be-evaluated device, and a smaller time deviation value between the predicted system time and the actual system time indicates better quality of the software running environment of the to-be-evaluated device. In this case, the time deviation value in the current time period in the N time periods can be calculated. In addition, because the time deviation values in all of the (N−1) time periods before the current time period have been pre-calculated, the time deviation values of the to-be-evaluated device in all of the N time periods can be determined by using the method provided in this embodiment.

In addition, step S26 "Determine, based on the predicted system time and the actual system time, the time deviation value of the to-be-evaluated device in the current time period" are implemented in numerous manners. The following briefly describes several manners.

In a first manner, the "Determine, based on the predicted system time and actual system time, the time deviation value of the to-be-evaluated device in the current time period" may include the following steps:

Step 1: Send the predicted system time to the target device.

Step 2: Receive the time deviation value of the to-be-evaluated device in the current time period sent by the target device, where the time deviation value of the to-be-evaluated device in the current time period is a time deviation value calculated by the target device based on the predicted system time and the actual system time.

In the first manner, the target device may frequently adjust system time, and therefore the actual system time changes. In this case, the to-be-evaluated device may send the predicted system time to the target device, so that the target device calculates the time deviation value based on the predicted system time and the actual system time. This ensures accuracy of the actual system time. Then the to-be-evaluated device further the time deviation value of the to-be-evaluated device in the current time period sent by the target device, to ensure that the calculated time deviation value is more accurate.

In a second manner, the "Determine, based on the predicted system time and actual system time, the time deviation value of the to-be-evaluated device in the current time period" may include the following steps:

Step 1: Send a request for obtaining the actual system time to the target device.

Step 2: Receive the actual system time sent by the target device.

Step 3: Calculate, based on the predicted system time and the actual system time, the time deviation value of the to-be-evaluated device in the current time period.

In the second manner, the target device may frequently adjust system time, and therefore the actual system time changes. In this case, the to-be-evaluated device may send the request for obtaining the actual system time to the target device, so that the target device sends an adjusted actual system time to the to-be-evaluated device. Then the to-be-evaluated device calculates the time deviation value by using the actual system time adjusted by the target device and the predicted system time, to ensure that the calculated time deviation value is more accurate.

In a third manner, the "Determine, based on the predicted system time and actual system time, the time deviation value of the to-be-evaluated device in the current time period" may include the following steps:

Step 1: Obtain the pre-stored actual system time.

Step 2: Calculate, based on the predicted system time and the actual system time, the time deviation value of the to-be-evaluated device in the current time period.

In the third manner, in some scenarios, the target device may not adjust the system time, and therefore the actual system time remains unchanged. In this case, the to-be-evaluated device may calculate, by using the pre-stored actual system time and the calculated predicted system time, the time deviation value of the to-be-evaluated device in the current time period. Interaction with the target device is not required, saving system resources of the to-be-evaluated device.

To better illustrate a principle of the method shown in FIG. 3, the following provides description by examples.

Figure 4:
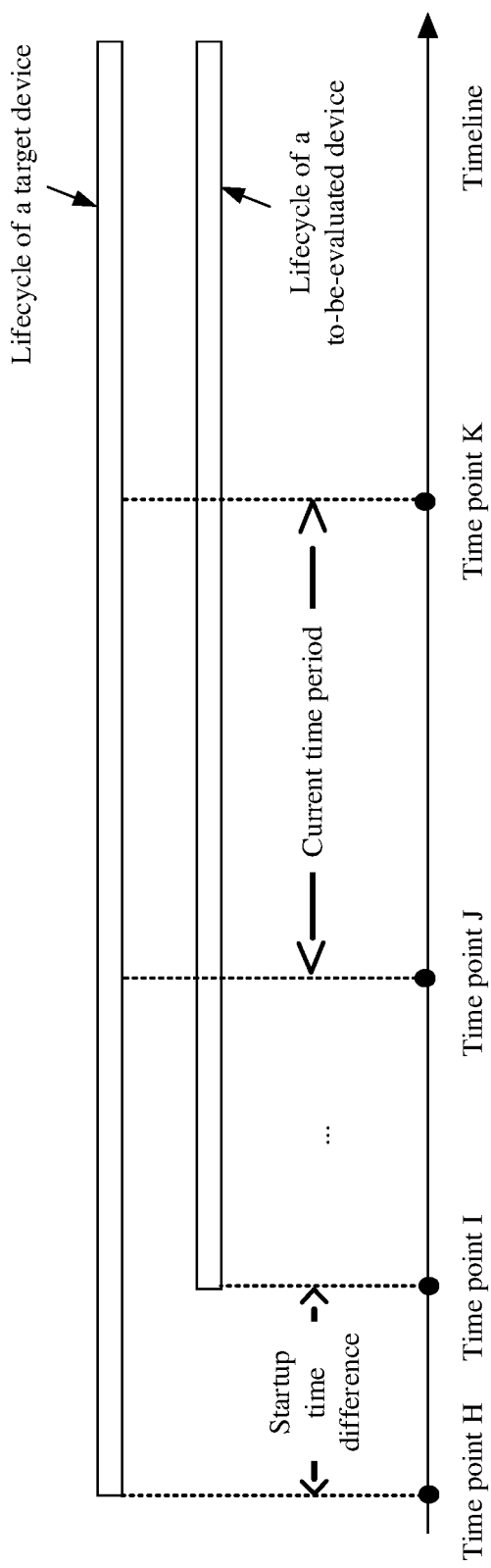
FIG. 4 is a schematic diagram of a current time period in N time periods.

FIG. 4 is a schematic diagram of the current time period in N time periods. It is assumed that a time point H is the startup time point of the target device, a time point I is the startup time point of the to-be-evaluated device, a time point J is the starting time point in the current time period, and a time point K is the ending time point in the current time period.

Step 1: Obtain H–J running duration of the target device from the time point H to the time point J.

Step 2: Determine H–K running duration of the target device from the time point H to the time point K.

Step 3: Determine system time of the to-be-evaluated device at the time point K.

Step 4: Determine, based on the H–K running duration and the H–J running duration, J–K running duration of the target device from the time point J to the time point K.

Step 5: Determine, based on the system time at the time point K and the J–K running duration, predicted system time of the target device at the time point J.

Step 6: Determine, based on the predicted system time and the actual system time, the time deviation value of the to-be-evaluated device in the current time period.

Step 7: Obtain the time deviation values of the to-be-evaluated device in all of the (N−1) time periods before the current time period.

Optionally, the "Determine second running duration of the target device" in step S22 may further include the following steps:

Step 1: Obtain a time deviation value in a previous time period of the current time period.

Step 2: Obtain fourth running duration of the to-be-evaluated device, where the fourth running duration is running duration of the to-be-evaluated device at the ending time point in the current time period.

Step 3: Determine a startup time difference between the to-be-evaluated device and the target device.

Step 4: Determine the second running duration of the target device based on the fourth running duration, the startup time difference, and the time deviation value in the previous time period.

The to-be-evaluated device pre-stores the time deviation value in the previous time period of the current time period, the to-be-evaluated device records the fourth running duration, and the startup time difference between the to-be-evaluated device and the target device can be determined. Therefore, the second running duration of the target device can be obtained by adding the fourth running duration, the startup time difference and the time deviation value in the previous time period.

To better describe how the "Determine second running duration of the target device" is implemented in step S22, the following is described by using examples.

Figure 5:
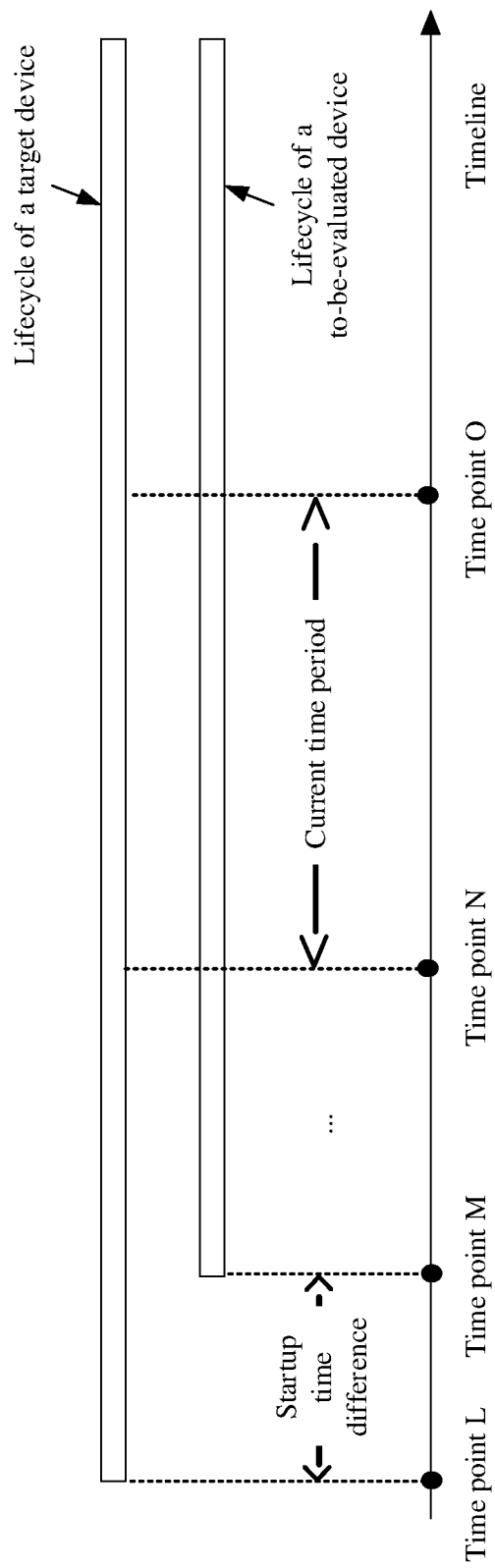
FIG. 5 is a schematic diagram of a current time period in N time periods.

FIG. 5 is a schematic diagram of the current time period in N time periods. It is assumed that a time point L is the startup time point of the target device, a time point M is the startup time point of the to-be-evaluated device, a time point N is the starting time point in the current time period, and a time point O is the ending time point in the current time period.

Step 1: Obtain a time deviation value in a previous time period of the current time period.

Step 2: Obtain the M–O running duration of the to-be-evaluated device from the time point M to the time point O.

Step 3: Determine a startup time difference between the to-be-evaluated device and the target device, where the startup time difference is duration from the time point L to the time point M.

Step 4: Determine, based on the M–O running duration, the startup time difference, and the time deviation value in the previous time period, L–O running duration of the target device from the time point L to the time point O.

Optionally, the step of "Determine a startup time difference between the to-be-evaluated device and the target device" may further include the following steps:

Step 1: Obtain second system time and fifth running duration of the target device, where the second system time is system time of the target device at a first target time point, and the fifth running duration is running duration of the target device at the first target time point.

Step 2: Obtain third system time and sixth running duration of the to-be-evaluated device, where the third system time is system time of the to-be-evaluated device at a second target time point, and the sixth running duration is running duration of the to-be-evaluated device at the second target time point, with the first target time point being earlier than the second target time point.

Step 3: Determine, based on the second system time and the third system time, duration between the first target time point and the second target time point.

Step 4: Determine, based on the duration and the fifth running duration, seventh running duration of the target device at the second target time point.

Step 5: Determine, based on the seventh running duration and the sixth running duration, the startup time difference between the to-be-evaluated device and the target device.

The first target time point and the second target time point are both time points before the starting time point in the current time period, and the first target time point is earlier than the second target time point. The duration between the first target time point and the second target time point can be determined by calculating a time difference between the second system time and the third system time. The seventh running duration of the target device at the second target time point can be determined by adding the duration and the fifth running duration. Because the seventh running duration is the running duration of the target device at the second target time point, and the sixth running duration is the running duration of the to-be-evaluated device at the second target time point, the startup time difference between the to-be-evaluated device and the target device can be determined by calculating a time difference between the seventh running duration and the sixth running duration.

To better describe how the "Determine a startup time difference between the to-be-evaluated device and the target device" is implemented, the following is described by using examples.

Figure 6:
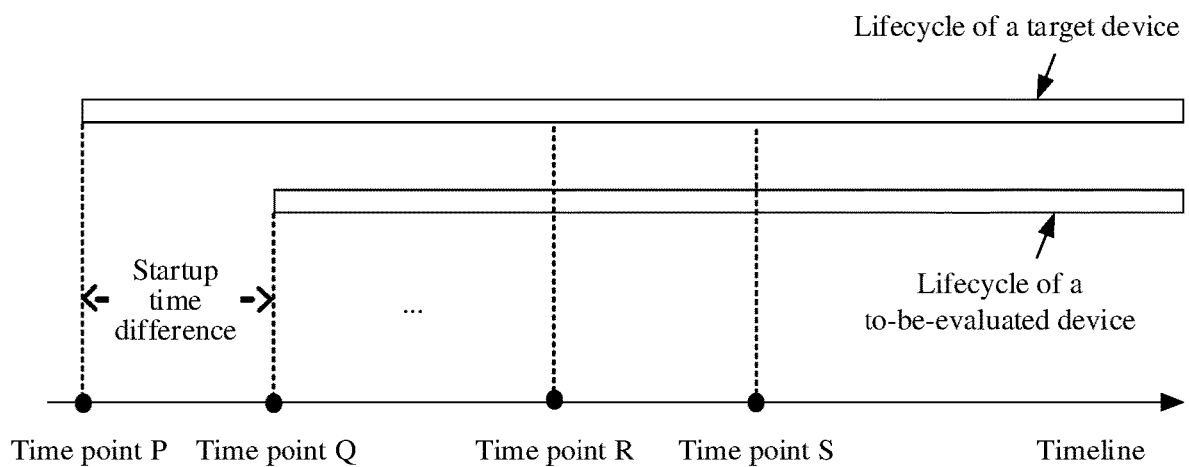
FIG. 6 is a schematic diagram of a lifecycle of a target device and a lifecycle of a to-be-evaluated device.

FIG. 6 is a schematic diagram of a lifecycle of the target device and a lifecycle of the to-be-evaluated device. It is assumed that a time point P is the startup time point of the target device, a time point Q is the startup time point of the to-be-evaluated device, a time point R is the first target time point, and a time point S is the second target time point.

Step 1: Obtain system time of the target device at the time point R, and obtain P–R running duration of the target device from the time point P to the time point R.

Step 2: Obtain system time of the to-be-evaluated device at the time point S, and obtain Q–S running duration of the to-be-evaluated device from the time point Q to the time point S.

Step 3: Calculate a difference between the system time at the time point R and the system time at the time point S, to obtain duration from the time point R to the time point S.

Step 4: Calculate a sum of the R–S duration and the P–R running duration, to obtain P–S running duration of the target device from the time point P to the time point S.

Step 5: Calculate a difference between the P–S running duration and the Q–S running duration, to obtain the startup time difference between the to-be-evaluated device and the target device, where the startup time difference is duration from the time point P to the time point Q.

Figure 7:
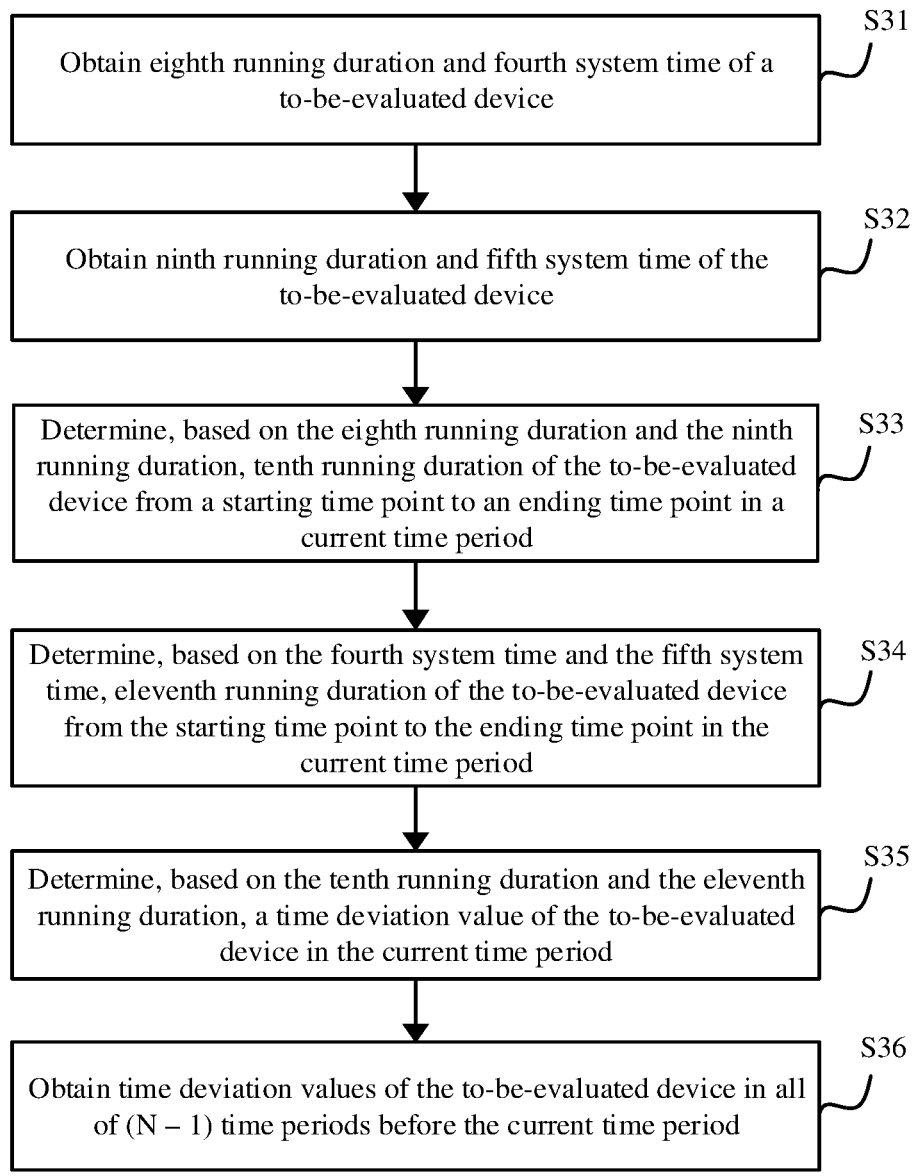
FIG. 7 is a flowchart of an embodiment described in detail based on step S11 in FIG. 1.

Referring to FIG. 7, an embodiment shown in FIG. 7 is a flowchart of an embodiment described in detail based on step S11 in FIG. 1. Therefore, for the same content as that in FIG. 1, refer to the embodiment shown in FIG. 1. The method shown in FIG. 7 is a exemplary implementation of "Determine time deviation values of a to-be-evaluated device in all of N time periods" in step S11 in FIG. 1. The "Determine time deviation values of a to-be-evaluated device in all of N time periods" may further include the following steps.

Step S31: Obtain eighth running duration and fourth system time of the to-be-evaluated device.

The eighth running duration is running duration of the to-be-evaluated device at an ending time point in the current time period, and the fourth system time is system time of the to-be-evaluated device at the ending time point in the current time period.

Step S32: Obtain ninth running duration and fifth system time of the to-be-evaluated device.

The ninth running duration is running duration of the to-be-evaluated device at a starting time point in the current time period, and the fifth system time is system time of the to-be-evaluated device at the starting time point in the current time period.

Step S33: Determine, based on the eighth running duration and the ninth running duration, tenth running duration of the to-be-evaluated device from the starting time point to the ending time point in the current time period.

Step S34: Determine, based on the fourth system time and the fifth system time, eleventh running duration of the to-be-evaluated device from the starting time point to the ending time point in the current time period.

Step S35: Determine, based on the tenth running duration and the eleventh running duration, the time deviation value of the to-be-evaluated device in the current time period.

Step S36: Obtain the time deviation values of the to-be-evaluated device in all of the (N–1) time periods before the current time period.

In the embodiment shown in FIG. 7, the fourth system time and the fifth system time of the to-be-evaluated device may be inaccurate because both the fourth system time and the fifth system time of the to-be-evaluated device are obtained by using a network. The eighth running duration and the ninth running duration of the to-be-evaluated device are comparatively accurate because the eighth running duration and the ninth running duration of the to-be-evaluated device are internal statistical results of the to-be-evaluated device. In this case, if it is determined, based on the tenth running duration and the eleventh running duration, that the to-be-evaluated device has a time deviation value in the current time period, the time deviation value is caused by inaccurate fourth system time and inaccurate fifth system time. The quality of the network environment of the to-be-evaluated device can be evaluated in this embodiment. A greater time deviation value indicates worse quality of a network environment of the to-be-evaluated device, and a smaller time deviation value indicates better quality of the network environment of the to-be-evaluated device.

To better describe a principle of the method shown in FIG. 7, the following provides description by examples.

Figure 8:
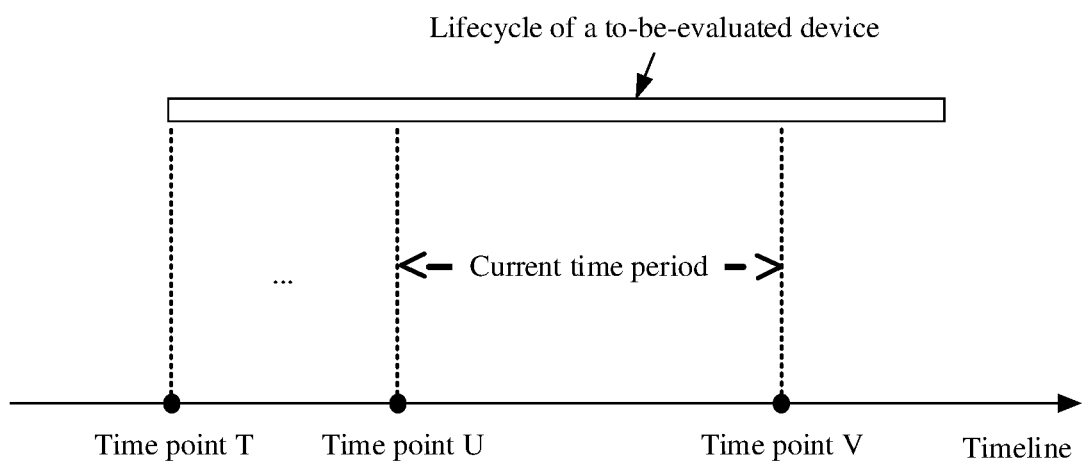
FIG. 8 is a schematic diagram of a current time period in N time periods.

FIG. 8 is a schematic diagram of the current time period in N time periods. It is assumed that a time point T is the startup time point of the to-be-evaluated device, a time point U is the starting time point in the current time period, and a time point V is the ending time point in the current time period.

Step 1: Obtain T–V running duration of the to-be-evaluated device from the time point T to the time point V and system time of the to-be-evaluated device at the time point V.

Step 2: Obtain T–U running duration of the to-be-evaluated device from the time point T to the time point U and system time of the to-be-evaluated device at the time point U.

Step 3: Calculate a difference between the T–V running duration and the T–U running duration, to obtain first U–V running duration of the to-be-evaluated device from the time point U to the time point V.

Step 4: Calculate a difference between the system time at the time point V and the system time at the time point U, to obtain second U–V running duration of the to-be-evaluated device from the time point U to the time point V.

Step 5: Calculate a difference between the first U–V running duration and the second U–V running duration, to obtain a time deviation value of the to-be-evaluated device from the time point U to the time point V.

Step 6: Obtain the time deviation values of the to-be-evaluated device in all of the (N−1) time periods before the current time period.

Figure 9:
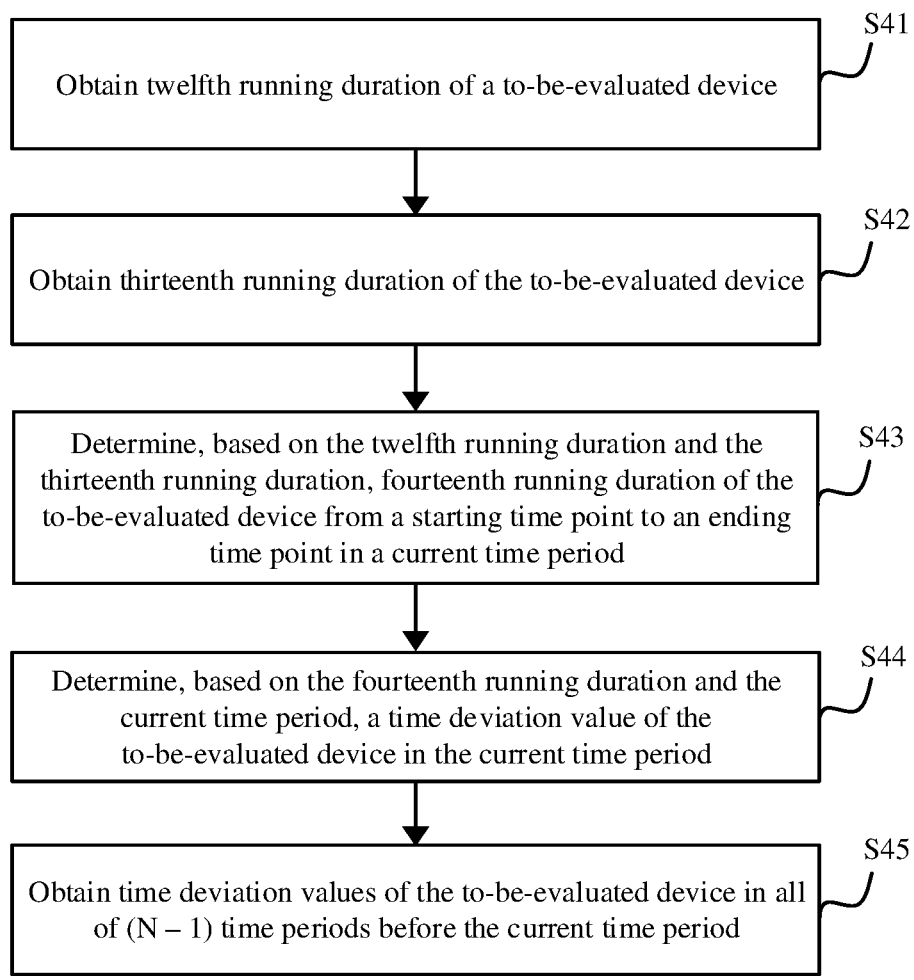
FIG. 9 is a flowchart of an embodiment described in detail based on step S11 in FIG. 1.

Referring to FIG. 9, an embodiment shown in FIG. 9 is a flowchart of an embodiment described in detail based on step S11 in FIG. 1. Therefore, for the same content as that in FIG. 1, refer to the embodiment shown in FIG. 1. The method shown in FIG. 9 is a exemplary implementation of "Determine time deviation values of a to-be-evaluated device in all of N time periods" in step S11 in FIG. 1. The "Determine time deviation values of a to-be-evaluated device in all of N time periods" may further include the following steps.

Step S41: Obtain twelfth running duration of the to-be-evaluated device, where the twelfth running duration is running duration of the to-be-evaluated device at an ending time point in the current time period, and the ending time point in the current time period is determined by a period timer.

The period timer runs on the to-be-evaluated device, and the quality of the software running environment of the to-be-evaluated device directly affects accuracy of the period timer. Better quality of the software running environment of the to-be-evaluated device indicates higher accuracy of the period timer, and worse quality of the software running environment of the to-be-evaluated device indicates lower accuracy of the period timer.

Step S42: Obtain thirteenth running duration of the to-be-evaluated device, where the thirteenth running duration is running duration of the to-be-evaluated device at a starting time point in the current time period, and the starting time point in the current time period is determined by the period timer.

Step S43: Determine, based on the twelfth running duration and the thirteenth running duration, fourteenth running duration of the to-be-evaluated device from the starting time point to the ending time point in the current time period.

Step S44: Determine, based on the fourteenth running duration and the current time period, the time deviation value of the to-be-evaluated device in the current time period.

If the time deviation value of the to-be-evaluated device in the current time period is greater than 0, it indicates that there is an accuracy deviation because the period timer is affected by the software running environment of the to-be-evaluated device.

Step S45: Obtain the time deviation values of the to-be-evaluated device in all of the (N−1) time periods before the current time period.

In the embodiment shown in FIG. 9, there is the accuracy deviation because the period timer is affected by the software running environment of the to-be-evaluated device; in this case, the time deviation value of the to-be-evaluated device in the current time period can reflect the quality of the software running environment of the to-be-evaluated device. A greater time deviation value indicates worse quality of a network environment of the to-be-evaluated device, and a smaller time deviation value indicates better quality of the network environment of the to-be-evaluated device.

To better illustrate the principle of the method shown in FIG. 9, the following provides description by examples.

Figure 10:
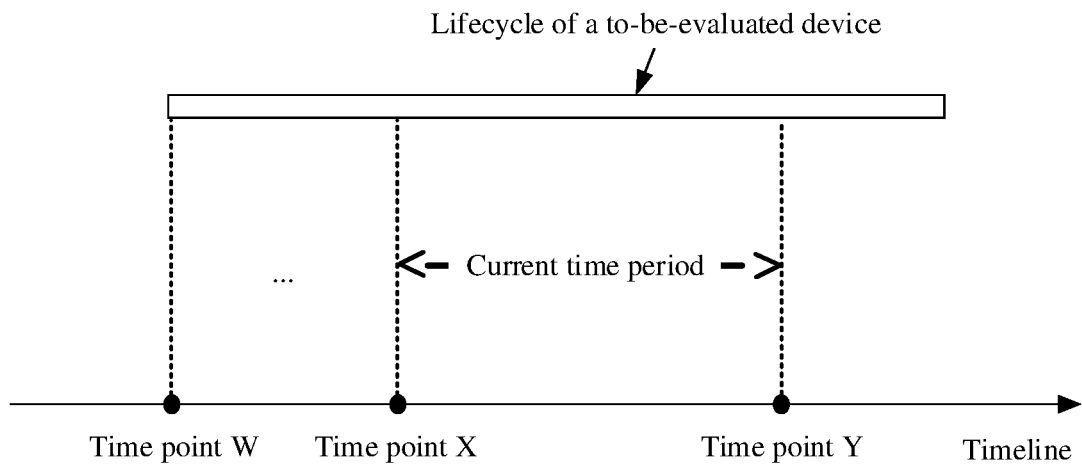
FIG. 10 is a schematic diagram of a current time period in N time periods.

FIG. 10 is a schematic diagram of the current time period in N time periods. It is assumed that a time point W is the startup time point of the to-be-evaluated device, a time point X is the starting time point in the current time period, and a time point Y is the ending time point in the current time period.

Step 1: Obtain W–Y running duration of the to-be-evaluated device at the time point Y in the current time period, where the time point Y in the current time period is determined by the period timer.

Step 2: Obtain W–X running duration of the to-be-evaluated device at the time point X in the current time period, where the time point X in the current time period is determined by the period timer.

Step 3: Calculate a difference between the W–Y running duration and the W–X running duration, to obtain X–Y running duration of the to-be-evaluated device from the time point X to the time point Y in the current time period.

Step 4: Calculate a difference between the X–Y running duration and the current time period, to obtain the time deviation value of the to-be-evaluated device in the current time period.

Step 5: Obtain the time deviation values of the to-be-evaluated device in all of the (N−1) time periods before the current time period.

Certainly, with reference to the embodiment shown in FIG. 7 and the embodiment shown in FIG. 9, the embodiments may generate a new embodiment. For example, the target timing jitter amplitude calculated in the manner in the embodiment shown in FIG. 7 is determined as a first target timing jitter amplitude, the target timing jitter amplitude calculated in the manner in the embodiment shown in FIG. 9 is determined as a second target timing jitter amplitude, a mean value of the first target timing jitter amplitude and the second target timing jitter amplitude is determined as a specified timing jitter amplitude, and finally the specified timing jitter amplitude is determined as the evaluation parameter for measuring the quality of the software running environment of the to-be-evaluated device. The above-described embodiments should be regarded as illustrative rather than restrictive, and it should be appreciated that variations to those embodiments can be made by those skilled in the art without departing from the scope of the invention.

Figure 11:
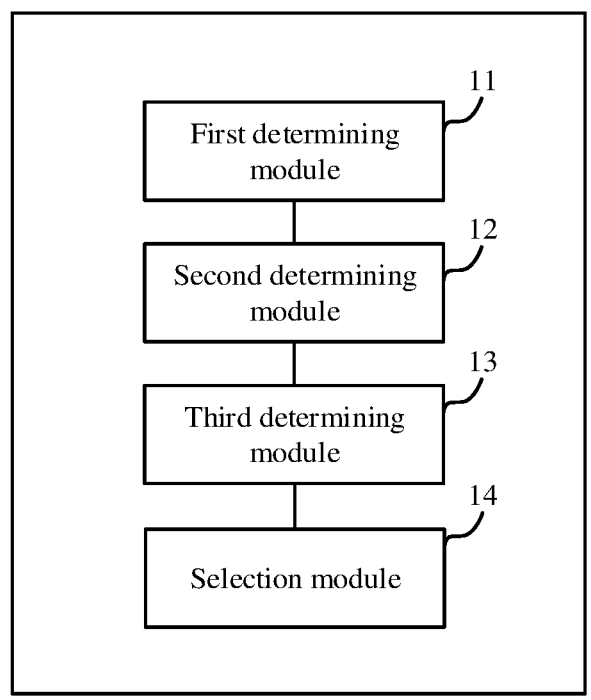
FIG. 11 is a schematic diagram of an apparatus for evaluating quality of a software running environment of a device according to an embodiment.

FIG. 11 is a schematic diagram of an apparatus for evaluating quality of a software running environment of a device according to an embodiment of this application. FIG. 11 shows an apparatus embodiment corresponding to FIG. 1 to FIG. 10. For the same content in FIG. 11 as FIG. 1 to FIG. 10, refer to the embodiments corresponding to FIG. 1 to FIG. 10. Referring to FIG. 11, the apparatus includes the following modules:

a first determining module 11, configured to determine time deviation values of a to-be-evaluated device in all of N time periods, where the time deviation values in all of the N time periods include a time deviation value in a current time period and time deviation values in (N−1) time periods before the current time period, and N is a positive integer greater than or equal to 2;

a second determining module 12, configured to determine an inherent deviation value based on the time deviation values in all of the N time periods, wherein the inherent deviation value is a mean value of the time deviation values in all of the N time periods;

a third determining module 13, configured to determine, based on the time deviation values in all of the N time periods and the inherent deviation value, timing jitter amplitudes in all of the N time periods; and a selection module 14, configured to select, from the timing jitter amplitudes in all of the N time periods, a target timing jitter amplitude with a largest timing jitter amplitude, where the target timing jitter amplitude is an evaluation parameter for measuring the quality of the software running environment of the to-be-evaluated device.

Optionally, the first determining module 11 can be configured to: obtain first running duration of a target device, where the first running duration is running duration of the target device at a starting time point in the current time period; determine second running duration of the target device, where the second running duration is running duration of the target device at an ending time point in the current time period; determine first system time of the to-be-evaluated device at the ending time point in the current time period; determine, based on the second running duration and the first running duration, third running duration of the target device from the starting time point to the ending time point in the current time period; determine, based on the first system time and the third running duration, predicted system time of the target device at the starting time point in the current time period; determine, based on the predicted system time and actual system time, the time deviation value of the to-be-evaluated device in the current time period, where the actual system time is system time of the target device at the starting time point in the current time period; and obtain the time deviation values of the to-be-evaluated device in all of the (N−1) time periods before the current time period.

Optionally, the first determining module 11 is configured to: obtain a time deviation value in a previous time period of the current time period; obtain fourth running duration of the to-be-evaluated device, where the fourth running duration is running duration of the to-be-evaluated device at the ending time point in the current time period; determine a startup time difference between the to-be-evaluated device and the target device; and determine the second running duration of the target device based on the fourth running duration, the startup time difference, and the time deviation value in the previous time period.

Optionally, the first determining module 11 is configured to: obtain second system time and fifth running duration of the target device, where the second system time is system time of the target device at a first target time point, and the fifth running duration is running duration of the target device at the first target time point; obtain third system time and sixth running duration of the to-be-evaluated device, where the third system time is system time of the to-be-evaluated device at a second target time point, and the sixth running duration is running duration of the to-be-evaluated device at the second target time point, with the first target time point being earlier than the second target time point; determine, based on the second system time and the third system time, duration between the first target time point and the second target time point; determine, based on the duration and the fifth running duration, seventh running duration of the target device at the second target time point; and determine, based on the seventh running duration and the sixth running duration, the startup time difference between the to-be-evaluated device and the target device.

Optionally, the first determining module 11 is configured to: send the predicted system time to the target device; and receive the time deviation value of the to-be-evaluated device in the current time period sent by the target device, where the time deviation value of the to-be-evaluated device in the current time period is a time deviation value calculated by the target device based on the predicted system time and the actual system time.

Optionally, the first determining module 11 is configured to: send a request for obtaining the actual system time to the target device; receive the actual system time sent by the target device; and calculate, based on the predicted system time and the actual system time, the time deviation value of the to-be-evaluated device in the current time period.

Optionally, the first determining module 11 is configured to: obtain the pre-stored actual system time; and calculate, based on the predicted system time and the actual system time, the time deviation value of the to-be-evaluated device in the current time period.

Optionally, the first determining module 11 is configured to: obtain eighth running duration and fourth system time of the to-be-evaluated device, where the eighth running duration is running duration of the to-be-evaluated device at an ending time point in the current time period, and the fourth system time is system time of the to-be-evaluated device at the ending time point in the current time period; obtain ninth running duration and fifth system time of the to-be-evaluated device, where the ninth running duration is running duration of the to-be-evaluated device at a starting time point in the current time period, and the fifth system time is system time of the to-be-evaluated device at the starting time point in the current time period; determine, based on the eighth running duration and the ninth running duration, tenth running duration of the to-be-evaluated device from the starting time point to the ending time point in the current time period; determine, based on the fourth system time and the fifth system time, eleventh running duration of the to-be-evaluated device from the starting time point to the ending time point in the current time period; determine, based on the tenth running duration and the eleventh running duration, the time deviation value of the to-be-evaluated device in the current time period; and obtain the time deviation values of the to-be-evaluated device in all of the (N−1) time periods before the current time period.

Optionally, the first determining module 11 is configured to: obtain twelfth running duration of the to-be-evaluated device, where the twelfth running duration is running duration of the to-be-evaluated device at an ending time point in the current time period, and the ending time point in the current time period is determined by a period timer; obtain thirteenth running duration of the to-be-evaluated device, where the thirteenth running duration is running duration of the to-be-evaluated device at a starting time point in the current time period, and the starting time point in the current time period is determined by the period timer; determine, based on the twelfth running duration and the thirteenth running duration, fourteenth running duration of the to-be-evaluated device from the starting time point to the ending time point in the current time period; determine, based on the fourteenth running duration and the current time period, the time deviation value of the to-be-evaluated device in the current time period; and obtain the time deviation values of the to-be-evaluated device in all of the (N−1) time periods before the current time period.

Figure 12:
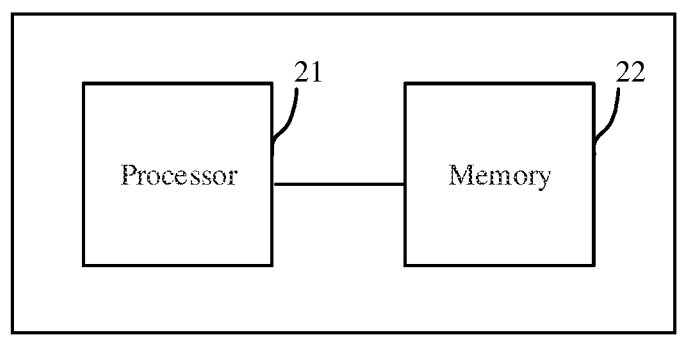
FIG. 12 is another schematic diagram of an apparatus for evaluating quality of a software running environment of a device according to an embodiment.

FIG. 12 is another schematic diagram of an apparatus for evaluating quality of a software running environment of a device according to an embodiment. FIG. 12 is an apparatus embodiment corresponding to FIG. 1 to FIG. 10, and for the same content in FIG. 12 as FIG. 1 to FIG. 10, refer to the embodiments corresponding to FIG. 1 to FIG. 10. Referring to FIG. 12, the apparatus includes a processor 21 and a memory 22. The memory 22 stores an operation instruction executable by the processor 21, and the processor 21 reads the operation instruction stored in the memory 22 to implement the method provided above.

It can be noted that, the provided embodiments are merely optional embodiments. A person skilled in the art can design more embodiments based on the embodiments, and details are not described herein for the sake of brevity.

A person of ordinary skill in the art may be aware that units and algorithm steps in the examples described with reference to the disclosed embodiments may be implemented by electronic hardware or a combination of computer software and electronic hardware. Whether the functions are performed by hardware or software depends on applications and design constraints of the technical solutions. A person skilled in the art may use a different method to implement the described functions for each application, but it can not be considered that the implementation goes beyond the protection scope.

It may be clearly understood by a person skilled in the art that, for the purpose of convenient and brief description, for a detailed working process of the foregoing system, apparatus, and unit, reference may be to a corresponding process in the foregoing method embodiments, and details are not described herein again for the sake of brevity.

In the several provided embodiments, it can be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the provided technical solutions essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc. Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for evaluating quality of a software running environment of a device, comprising:
    determining time deviation values of a to-be-evaluated device in all of N time periods, wherein the time deviation values in all of the N time periods comprise a current time deviation value in a current time period and previous time deviation values in (N−1) time periods before the current time period, and N is a positive integer greater than or equal to 2;
    determining an inherent deviation value based on the time deviation values in all of the N time periods, wherein the inherent deviation value is a mean value of the time deviation values in all of the N time periods;
    determining, based on the time deviation values in all of the N time periods and the inherent deviation value, timing jitter amplitudes in all of the N time periods;
    selecting, from the timing jitter amplitudes in all of the N time periods, a target timing jitter amplitude with a largest timing jitter amplitude, wherein the target timing jitter amplitude is an evaluation parameter for measuring the quality of the software running environment of the to-be-evaluated device.

2. The method for evaluating the quality of the software running environment of the device according to claim 1, wherein the determining of the time deviation values of the to-be-evaluated device in all of the N time periods comprises:
    obtaining a first running duration of a target device, wherein the first running duration is a running duration of the target device at a starting time point in the current time period;
    determining a second running duration of the target device, wherein the second running duration is the running duration of the target device at an ending time point in the current time period;
    determining a first system time of the to-be-evaluated device at the ending time point in the current time period;

determining, based on the second running duration and the first running duration, a third running duration of the target device from the starting time point to the ending time point in the current time period;

determining, based on the first system time and the third running duration, a predicted system time of the target device at the starting time point in the current time period;

determining, based on the predicted system time and an actual system time, the current time deviation value of the to-be-evaluated device in the current time period, wherein the actual system time is a system time of the target device at the starting time point in the current time period; and obtaining the previous time deviation values of the to-be-evaluated device in all of the (N−1) time periods before the current time period.

3. The method for evaluating the quality of the software running environment of the device according to claim 2, wherein the determining of the second running duration of the target device comprises:

obtaining the previous time deviation value in a previous time period of the current time period;

obtaining a fourth running duration of the to-be-evaluated device, wherein the fourth running duration is the running duration of the to-be-evaluated device at the ending time point in the current time period;

determining a startup time difference between the to-be-evaluated device and the target device; and determining the second running duration of the target device based on the fourth running duration, the startup time difference, and the previous time deviation value in the previous time period.

4. The method for evaluating the quality of the software running environment of the device according to claim 3, wherein the determining of the startup time difference between the to-be-evaluated device and the target device comprises:

obtaining a second system time and a fifth running duration of the target device, wherein the second system time is the system time of the target device at a first target time point, and the fifth running duration is the running duration of the target device at the first target time point;

obtaining a third system time and a sixth running duration of the to-be-evaluated device, wherein the third system time is the system time of the to-be-evaluated device at a second target time point, and the sixth running duration is the running duration of the to-be-evaluated device at the second target time point, with the first target time point being prior to the second target time point;

determining, based on the second system time and the third system time, a duration between the first target time point and the second target time point;

determining, based on the duration and the fifth running duration, a seventh running duration of the target device at the second target time point; and determining, based on the seventh running duration and the sixth running duration, the startup time difference between the to-be-evaluated device and the target device.

5. The method for evaluating the quality of the software running environment of the device according to claim 2, wherein the determining, based on the predicted system time and the actual system time, of the current time deviation value of the to-be-evaluated device in the current time period comprises:

sending the predicted system time to the target device; and receiving the current time deviation value of the to-be-evaluated device in the current time period sent by the target device, wherein the current time deviation value of the to-be-evaluated device in the current time period is calculated by the target device based on the predicted system time and the actual system time.

6. The method for evaluating the quality of the software running environment of the device according to claim 2, wherein the determining, based on the predicted system time and the actual system time, of the current time deviation value of the to-be-evaluated device in the current time period comprises:

sending a request for obtaining the actual system time to the target device;

receiving the actual system time sent by the target device; and calculating, based on the predicted system time and the actual system time, the current time deviation value of the to-be-evaluated device in the current time period.

7. The method for evaluating the quality of the software running environment of the device according to claim 2, wherein the determining, based on the predicted system time and the actual system time, of the current time deviation value of the to-be-evaluated device in the current time period comprises:

obtaining a pre-stored actual system time; and calculating, based on the predicted system time and the actual system time, the current time deviation value of the to-be-evaluated device in the current time period.

8. The method for evaluating the quality of the software running environment of the device according to claim 1, wherein the determining of the time deviation values of the to-be-evaluated device in all of the N time periods comprises:

obtaining an eighth running duration and a fourth system time of the to-be-evaluated device, wherein the eighth running duration is a running duration of the to-be-evaluated device at an ending time point in the current time period, and the fourth system time is a system time of the to-be-evaluated device at the ending time point in the current time period;

obtaining a ninth running duration and a fifth system time of the to-be-evaluated device, wherein the ninth running duration is the running duration of the to-be-evaluated device at a starting time point in the current time period, and the fifth system time is the system time of the to-be-evaluated device at the starting time point in the current time period;

determining, based on the eighth running duration and the ninth running duration, a tenth running duration of the to-be-evaluated device from the starting time point to the ending time point in the current time period;

determining, based on the fourth system time and the fifth system time, an eleventh running duration of the to-be-evaluated device from the starting time point to the ending time point in the current time period;

determining, based on the tenth running duration and the eleventh running duration, the current time deviation value of the to-be-evaluated device in the current time period; and obtaining the previous time deviation values of the to-be-evaluated device in all of the (N−1) time periods before the current time period.

9. The method for evaluating the quality of the software running environment of the device according to claim 1, wherein the determining of the time deviation values of the to-be-evaluated device in all of the N time periods comprises:
obtaining a twelfth running duration of the to-be-evaluated device, wherein the twelfth running duration is a running duration of the to-be-evaluated device at an ending time point in the current time period, and the ending time point in the current time period is determined by a period timer;
obtaining a thirteenth running duration of the to-be-evaluated device, wherein the thirteenth running duration is the running duration of the to-be-evaluated device at a starting time point in the current time period, and the starting time point in the current time period is determined by the period timer;
determining, based on the twelfth running duration and the thirteenth running duration, a fourteenth running duration of the to-be-evaluated device from the starting time point to the ending time point in the current time period;
determining, based on the fourteenth running duration and the current time period, the current time deviation value of the to-be-evaluated device in the current time period; and
obtaining the previous time deviation values of the to-be-evaluated device in all of the (N−1) time periods before the current time period.

10. An apparatus for evaluating quality of a software running environment of a device, comprising:
a first determining module, configured to determine time deviation values of a to-be-evaluated device in all of N time periods, wherein the time deviation values in all of the N time periods comprise a current time deviation value in a current time period and previous time deviation values in (N−1) time periods before the current time period, and N is a positive integer greater than or equal to 2;
a second determining module, configured to determine an inherent deviation value based on the time deviation values in all of the N time periods, wherein the inherent deviation value is a mean value of the time deviation values in all of the N time periods;
a third determining module, configured to determine, based on the time deviation values in all of the N time periods and the inherent deviation value, timing jitter amplitudes in all of the N time periods; and
a selection module, configured to select, from the timing jitter amplitudes in all of the N time periods, a target timing jitter amplitude with a largest timing jitter amplitude, wherein the target timing jitter amplitude is an evaluation parameter for measuring the quality of the software running environment of the to-be-evaluated device.

11. The apparatus for evaluating the quality of the software running environment of the device according to claim 10, wherein
the first determining module is further configured to: obtain a first running duration of a target device, wherein the first running duration is a running duration of the target device at a starting time point in the current time period; determine a second running duration of the target device, wherein the second running duration is the running duration of the target device at an ending time point in the current time period; determine a first system time of the to-be-evaluated device at the ending time point in the current time period; determine, based on the second running duration and the first running duration, a third running duration of the target device from the starting time point to the ending time point in the current time period; determine, based on the first system time and the third running duration, a predicted system time of the target device at the starting time point in the current time period; determine, based on the predicted system time and an actual system time, the current time deviation value of the to-be-evaluated device in the current time period, wherein the actual system time is a system time of the target device at the starting time point in the current time period; and obtain the previous time deviation values of the to-be-evaluated device in all of the (N−1) time periods before the current time period.

12. The apparatus for evaluating the quality of the software running environment of the device according to claim 11, wherein
the first determining module is further configured to: obtain the previous time deviation value in a previous time period of the current time period; obtain a fourth running duration of the to-be-evaluated device, wherein the fourth running duration is the running duration of the to-be-evaluated device at the ending time point in the current time period; determine a startup time difference between the to-be-evaluated device and the target device; and determine the second running duration of the target device based on the fourth running duration, the startup time difference, and the previous time deviation value in the previous time period.

13. The apparatus for evaluating the quality of the software running environment of the device according to claim 12, comprising:
the first determining module is further configured to: obtain a second system time and a fifth running duration of the target device, wherein the second system time is the system time of the target device at a first target time point, and the fifth running duration is the running duration of the target device at the first target time point; obtain a third system time and a sixth running duration of the to-be-evaluated device, wherein the third system time is the system time of the to-be-evaluated device at a second target time point, and the sixth running duration is the running duration of the to-be-evaluated device at the second target time point, with the first target time point being prior to the second target time point; determine, based on the second system time and the third system time, a duration between the first target time point and the second target time point; determine, based on the duration and the fifth running duration, a seventh running duration of the target device at the second target time point; and determine, based on the seventh running duration and the sixth running duration, the startup time difference between the to-be-evaluated device and the target device.

14. The apparatus for evaluating the quality of the software running environment of the device according to claim 11, wherein
the first determining module is further configured to: send the predicted system time to the target device; and receive the current time deviation value of the to-be-evaluated device in the current time period sent by the target device, wherein the current time deviation value of the to-be-evaluated device in the current time period is calculated by the target device based on the predicted system time and the actual system time.

15. The apparatus for evaluating the quality of the software running environment of the device according to claim 11, wherein
the first determining module is further configured to: send a request for obtaining the actual system time to the target device; receive the actual system time sent by the target device; and calculate, based on the predicted system time and the actual system time, the current time deviation value of the to-be-evaluated device in the current time period.

16. The apparatus for evaluating the quality of the software running environment of the device according to claim 11, wherein
the first determining module is further configured to: obtain the pre-stored actual system time; and calculate, based on the predicted system time and the actual system time, the current time deviation value of the to-be-evaluated device in the current time period.

17. The apparatus for evaluating the quality of the software running environment of the device according to claim 10, wherein
the first determining module is further configured to: obtain an eighth running duration and a fourth system time of the to-be-evaluated device, wherein the eighth running duration is a running duration of the to-be-evaluated device at an ending time point in the current time period, and the fourth system time is a system time of the to-be-evaluated device at the ending time point in the current time period; obtain a ninth running duration and a fifth system time of the to-be-evaluated device, wherein the ninth running duration is the running duration of the to-be-evaluated device at a starting time point in the current time period, and the fifth system time is the system time of the to-be-evaluated device at the starting time point in the current time period; determine, based on the eighth running duration and the ninth running duration, a tenth running duration of the to-be-evaluated device from the starting time point to the ending time point in the current time period; determine, based on the fourth system time and the fifth system time, an eleventh running duration of the to-be-evaluated device from the starting time point to the ending time point in the current time period; determine, based on the tenth running duration and the eleventh running duration, the current time deviation value of the to-be-evaluated device in the current time period; and obtain the previous time deviation values of the to-be-evaluated device in all of the (N−1) time periods before the current time period.

18. The apparatus for evaluating the quality of the software running environment of the device according to claim 10, comprising:
the first determining module is further configured to: obtain a twelfth running duration of the to-be-evaluated device, wherein the twelfth running duration is a running duration of the to-be-evaluated device at an ending time point in the current time period, and the ending time point in the current time period is determined by a period timer; obtain a thirteenth running duration of the to-be-evaluated device, wherein the thirteenth running duration is the running duration of the to-be-evaluated device at a starting time point in the current time period, and the starting time point in the current time period is determined by the period timer; determine, based on the twelfth running duration and the thirteenth running duration, a fourteenth running duration of the to-be-evaluated device from the starting time point to the ending time point in the current time period; determine, based on the fourteenth running duration and the current time period, the current time deviation value of the to-be-evaluated device in the current time period; and obtain the previous time deviation values of the to-be-evaluated device in all of the (N−1) time periods before the current time period.

19. An apparatus for evaluating quality of a software running environment of a device, comprising: at least one processor and at least one memory, wherein the at least one memory stores at least one operation instruction executable by the at least one processor, and the at least one processor reads the at least one operation instruction stored in the memory to implement the method according to claim 1.

* * * * *